July 24, 1956　　　D. Z. ERLE　　　2,755,815
FLOW-COMPENSATED PRESSURE REDUCING VALVE
Filed April 13, 1953
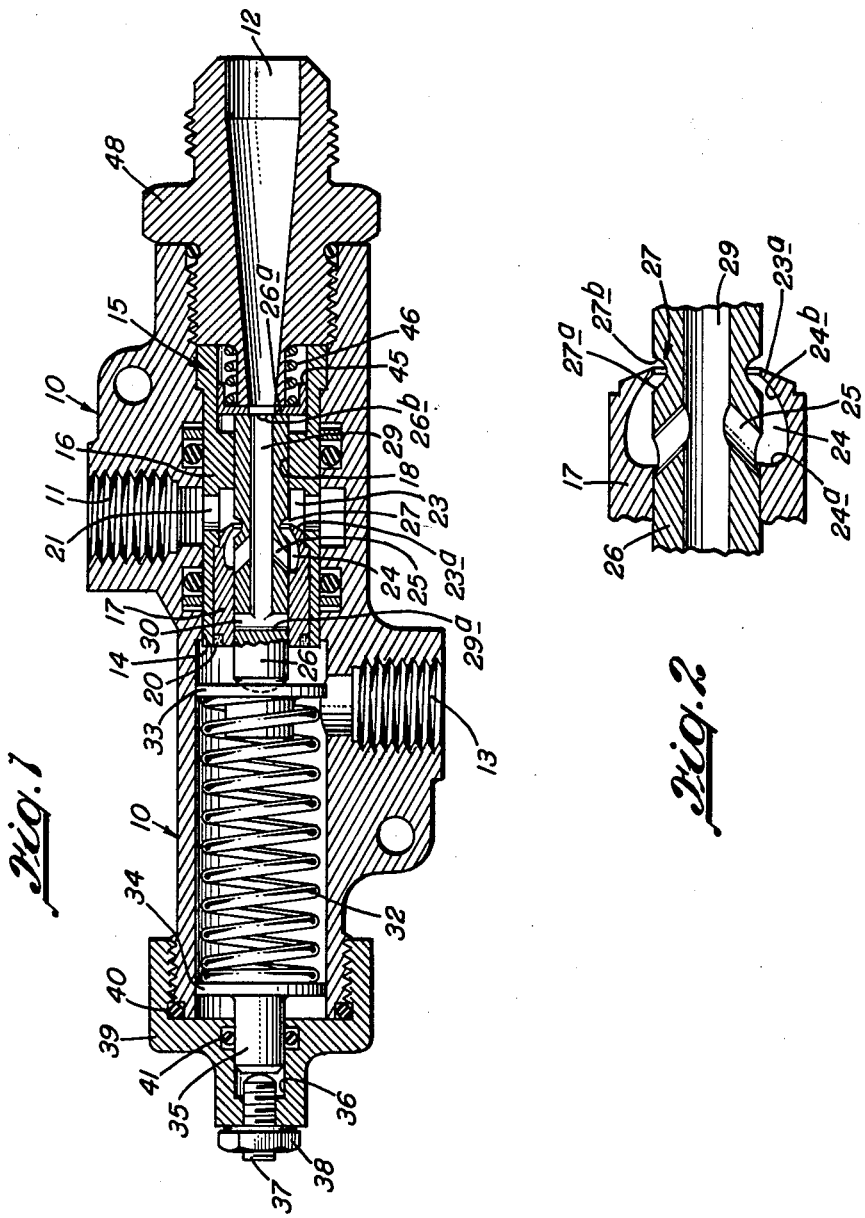
INVENTOR.
D. Z. ERLE
BY
ATTORNEY

United States Patent Office 2,755,815
Patented July 24, 1956

2,755,815

FLOW-COMPENSATED PRESSURE REDUCING VALVE

Donald Zaner Erle, Van Nuys, Calif., assignor to Bendix Aviation Corporation, North Hollywood, Calif., a corporation of Delaware Application April 13, 1953, Serial No. 348,227

5 Claims. (Cl. 137—484.2)

This invention relates to pressure-reducing valves and is particularly useful in such valves of the type in which flow is controlled by a shuttle piston urged in opening direction by a spring and in closing direction by the pressure of the discharge fluid acting on one end of the piston.

An object of the invention is to increase the constancy of output pressure of a pressure reducing valve over a range of flow rates.

Another object is to provide a simple and rugged pressure-reducing valve having relatively constant output pressure at all flow rates.

Other more specific objects and features of the invention will appear from the description to follow.

Pressure reducing valves of the shuttle piston type as heretofore constructed have relatively poor pressure regulation over the flow range, the output pressure falling off quite rapidly with increasing flow. This is due to a number of factors, one of which is the momentum force which is applied to the piston by changes in direction of the fluid flowing therethrough, which force varies directly with the rate of flow.

In accordance with the present invention, this momentum force is reversed in direction so that it opposes the other forces and tends to balance them out. Further in accordance with the invention, some of the other factors can be reduced in a manner to be hereafter explained. It is possible with the invention to provide a simple and practicable valve structure having either a substantially constant output pressure at all flow rates or an output pressure that rises with an increase in the flow rate.

A full understanding of the invention may be had from the following detailed description with reference to the drawing, in which:

Fig. 1 is a longitudinal sectional view through a pressure-reducing valve in accordance with the invention; and Fig. 2 is a portion of the view of Fig. 1 to a larger scale.

Referring to the drawing, the valve therein disclosed comprises a body 10 having an inlet passage 11, an outlet passage 12, and a return passage 13. The outer portion of the body 10 has a longitudinal bore 14 at its midsection which is in communication with the inlet passage 11 and contains a cylinder member 15 which is formed in two parts, consisting of a member 16 and a member 17. The member 16 has a central bore defining a portion of a stationary cylinder 18 and a counterbore of substantially larger diameter extending thereinto from the left end into which the member 17 is fitted and secured as by welding or brazing at the rear edge, as indicated at 20. The member 17 has a bore of the same diameter as the member 16 and aligned therewith, the two bores defining the stationary cylinder 18. The cylinder member 16 is provided with lateral passages 21 which communicate the inlet passage 11 with an annular cylinder entry port 23, which is defined by the right end of the counterbore in the cylinder member 16 and the downstream end of the cylinder member 17.

There is formed in that portion of the stationary cylinder 18 in the member 17 closely adjacent the entry port 23 an annular exit port 24 which registers at all times with lateral flow passages 25 in a piston 26 which is reciprocable in the stationary cylinder 18 and extends therebeyond at both ends. The piston 26 is also provided with a blind port 27 slightly spaced rightward from the lateral flow passages 25.

Piston 26 is also provided with a central flow passage 29 which extends from the right end of the piston through the major portion thereof and communicates with the lateral flow passages 25 and also with ports 30 positioned upstream from the flow ports.

The piston 26 is constantly urged to the right with substantial force by spring means consisting of a helical compression spring 32 which is compressed between a thrust member 33 bearing against the left end of piston 26 and an adjustable backing member 34 which is provided with a stem 35 extending into a hole 36 in the left end of the body 10 and supported against leftward movement by an adjusting screw 37 which extends to the exterior of the body 10. By turning the screw 37, the loading of the spring 32 can be varied, and the screw can be locked in a desired position of adjustment by a lock nut 38. A portion of the body 10 supporting the stem 35 is shown as an end cap 39 threaded onto the body 10 and sealed with respect thereto by an O-ring 40, and the stem 35 is sealed with respect to the cap 39 by an O-ring 41. It will be noted that the chamber containing the spring 32 is in open communication with the return passage 13 so that the left end of the piston 26 is subjected only to the low, relatively constant return pressure.

The cylinder member 16 is provided with an enlarged counterbore at its downstream end which receives a dash pot piston 45. This dash pot piston rests against the right end of the piston 26 and has a central aperture of substantially the same diameter as, and aligned with, the orifice of the piston flow passage 29. The dash pot piston 45 is normally maintained in contact with the right end of piston 26 by a helical compression spring 46, which is very light as compared to spring 32, so that it has negligible neutralizing effect thereon.

The right end of the body 10 consists of a removable closure member 48 threadedly connected to the remainder of the body and defining the outlet passage 12. The left end of the closure member 48 acts as a stop for the piston 26 and dash pot piston 45, limiting the movements thereof in opening direction. The outlet passage 12 tapers from a relatively large diameter at its outer (downstream) end to substantially the diameter of the aperture in the dash pot piston 45 at its upstream end.

As shown in the drawing, the piston 26 is in fully open position, into which it is normally urged by the spring 32 in the absence of other forces. In this open or extreme rightward position it will be observed that the piston blind port 27 communicates the cylinder entry port 23 with the cylinder exit port 24 which, as previously indicated, is always in communication with the piston flow passages 25, so that fluid flows from the inlet passage 11 through the cylinder entry port 23, piston blind port 27, cylinder exit port 24, piston flow passages 25, piston flow passage 29, and through the outlet passage 12. The piston remains in fully open or extreme right position until pressure forces derived from the fluid, chiefly the pressure force at the upstream end of the outlet passage 12, become of sufficient magnitude to overcome the force of the spring 32 and move the piston in leftward (closing) direction. Such movement reduces the flow passage provided by the piston blind port 27 between the cylinder entry port 23 and the cylinder exit port 24 and cuts off the flow completely when the piston blind port 27 is moved out of lapping relation with the cylinder entry port 23. Should the pressure in the outlet passage 12 increase still further, the piston 26 may be moved leftward a sufficient distance to uncover the return ports 30 and relieve pressure fluid from the outlet passage 12 into the return passage 13.

The direct pressure forces urging the piston 26 to the left are applied against its annular downstream face 26a which surrounds the flow passage 29, and against the left end 29a of passage 29. In this connection, it is to be noted that the sole purpose of the dash pot piston 45 is to prevent sudden movement of the piston 26 to the right and resultant violent increase in the pressure in the outlet passage 12. Such movement tends to draw a vacuum on the left side of the dash pot piston, which prevents the latter from moving except as fluid leaks around the dash pot piston and through a groove 26b in the piston face 26a.

Leftward movement of the piston 26 is not controlled by the dash pot piston 45, since a sudden rise in pressure in the outlet passage 12, acting against the piston faces 26a and 29a can move the piston 26 away from the dash pot piston 45.

In addition to the pressure forces acting against the annular right end face 26a of the piston 26 and the left end 29a of the piston flow passage 29, there are forces resulting from the change in direction of the fluid flow which are a function of the momentum of the fluid and will be referred to as "momentum forces." These forces are utilized in accordance with the present invention to produce forces on the piston aiding the force of the spring 32 thereon. It must be borne in mind that in a valve of this type any force opposing the spring 32 tends to close the valve and reduce the outlet pressure, whereas any force aiding the spring 32 tends to open the valve and increase the outlet pressure.

Considering the momentum forces, it will be observed that the left wall 23a of the cylinder entry port 23 is inclined inwardly and to the right, and that the right wall 27b of the piston port 27 extends at a high angle to the axis of the piston whereas the left wall 27a thereof extends at a much lower angle to the piston axis. On the other hand, the right wall 24b of the cylinder exit port 24 extends at a low angle to the piston axis whereas the left wall 24a extends at a high angle to the piston axis and is inclined at its radially inner edge toward the right. The result of the shapes of the cylinder entry port 23, the piston port 27 and the cylinder exit port 24 is that fluid enters the piston blind port 27 from the entry port 23 in a direction having a large radial component and a small rightward axial component. On the other hand, the fluid leaving the piston port 27 has a lesser radial component and a substantial leftward axial component. The result is that a rightward axial force is applied to the piston 26, determined by the momentum of the fluid flowing through the port, which depends upon the rate of flow. It will be observed that the cylinder entry port 23 is positioned quite close to the cylinder exit port 24 and that the left wall 24b of the entry port 24 and the right end wall 24b of the exit port 24 are defined by a wall member that is inclined toward the right end (the end to which pressure is applied) of the piston 26 at its radially inner (piston-contacting) edge.

The fluid entering the cylinder exit port 24 initially has a small radial component and a large leftward axial component. However, this direction is changed radically so that the fluid leaves the cylinder exit port 24 with a substantial radial component and an appreciable rightward axial component. As a result, the fluid flows through the piston flow passages 25 without exerting any great axial force on the piston in either direction. Of course, as the fluid enters the flow passage 29 from the flow ports 25 its axial component is increased, with a resultant leftward momentum force applied to the piston, but this force is smaller than it would be if the fluid did not enter the flow passages 25 with an appreciable rightward axial component. Furthermore, because of the large flow area in the piston passages 25 and the piston passage 29 compared to the flow area in the piston port 27, the velocity is much greater in port 27, and the momentum force applied to the piston in port 27 is much greater than that applied thereto in the passages 25.

Briefly, the forces acting upon the piston 26 which vary with the rate of flow through the valve are as follows:

1. The force due to the spring rate of spring 32.
2. Momentum forces.
3. The pressure drop in the piston passage 29.
4. Pressure difference between the outlet of the piston passage 29 and the outer end of the outlet passage 12.

As to item 1, it is obvious that the spring 32 is less highly stressed at a large valve opening, when the piston 26 is in its extreme rightward position, than it is at smaller valve openings, and therefore a lesser output pressure will balance the spring at wide openings than at small openings.

As to item 2, the dynamic forces are utilized in the present invention, as already outlined, to apply momentum forces to the piston, urging it in opening direction, in aiding relation to the spring 32.

As to item 3, the pressure drop in the piston flow passage 29 causes a greater pressure differential between the left end of the passage 29 and the right end face of the piston 26 at high flows than at low flows. Therefore, the average pressure acting against the piston in opposition to the spring 32 is greater than the output pressure at the downstream end of the passage 29 by a factor increasing with the rate of flow.

As to item 4, the pressure at the end of the relatively small diameter flow passage 29 will be less than at the large diameter outer end of the outlet passage 12 because of the Venturi effect. The differential pressure between the ends of the outlet passage 12 increases with rate of flow and tends to open the valve wider at high flows.

The advantages of the present construction over a similar prior art valve can be appreciated from the following comparison of the flow-responsive forces therein. In this connection, it is to be understood that the prior art valve would have the same dimensions as the instant valve and would differ therefrom only in that: (a) the exit port 27 in the piston and the exit port 24 in the cylinder would be eliminated; (b) the piston flow passages 25 would extend radially and be positioned to lap the left edge of the cylinder entry port 23; and (c) the outlet passage 12 would be of the same diameter throughout as the outer end diameter in the instant valve.

|  | Prior Valve | New Valve |
| --- | --- | --- |
|  | p. s. i. | p. s. i. |
| Output pressure at flow of 20 cu. in. per minute | 1,200 | 1,200 |
| Outflow pressure at flow of 8 G. P. M. | 960 | 1,292 |
| Variation in output pressure | −240 | +92 |

The foregoing characteristics are those of valves having the same dimensions, when supplied with fluid at an input pressure of 3000 p. s. i. In each valve the diameter of the outlet passage was .391 in., of the flow passage 29 was ⅛ in. and the other ports in proportion as shown in the drawing.

It will be observed that in the particular example given the new valve has a rising pressure with increased flow, as compared to a dropping pressure with the prior valve.

This is due to the fact that in the old valve the sum of the forces tending to move the piston 26 in closing direction increased with flow, whereas in the new valve they decrease. The variations in the closing forces produced by different factors at the high flow of 8 G. P. M. as compared to the low flow of 20 cu. in. per min. are as follows:

|  | Prior Valve | New Valve |
|---|---|---|
| Spring rate | +6.4 | +6.4 |
| Momentum of fluid | +11.3 | −4.2 |
| Pressure drop in piston passage | +5.5 | +4.4 |
| Pressure drop in outlet passage | −8 | −12.3 |
| Total | +15.2 | −5.7 |

It will be observed that the new valve changes the momentum forces 15.5 pounds in direction to increase the output pressure at the high flow rate, and also changes the pressure drops in the piston and output passages in desirable direction, but to a lesser extent.

The output pressure at high flow can be reduced by making the blind port surfaces 27a and/or 24b steeper and the surfaces 27b and/or 24a less steep, and vice versa.

Although for the purpose of explaining the invention a particular embodiment thereof has been shown and described, obvious modifications will occur to a person skilled in the art, and I do not desire to be limited to the exact details shown and described.

I claim:

1. A pressure-reducing valve comprising: a body having inlet and outlet passages and defining a stationary cylinder having intermediate its ends an entry cylinder port connected to said inlet passage and an exit cylinder port connected to said outlet passage, said cylinder ports being longitudinally displaced from each other; a piston reciprocable in said cylinder between open and closed positions and urged toward said closed position by pressure in said outlet passage acting on one end of said piston; spring means urging said piston toward said open position; said piston having a blind port so dimensioned and positioned relative to said cylinder ports as to overlap both said cylinder ports in said open position and be displaced from one cylinder port in said closed position; the wall of said piston blind port nearest said one end of said piston intersecting the piston surface at a higher angle to the piston axis than does the opposite wall of said port, whereby a momentum force increasing with flow and opposing said pressure on said one end is applied to the piston by fluid flowing through said piston blind port.

2. A valve according to claim 1 in which the adjacent walls of said cylinder ports are inclined toward said one end of the piston at their piston-contacting edges.

3. A valve according to claim 2 in which said exit cylinder port is more remote from said one end of the piston than said entry cylinder port, and the piston has a longitudinal passage extending from said one end and a lateral flow passage connecting with said longitudinal passage and registering with said cylinder exit port in all positions of said piston, said longitudinal piston passage communicating directly with said body outlet passage at said one end of the piston.

4. A valve according to claim 3 in which the wall of said exit port remote from said entry port is inclined at an angle to the piston axis in such direction as to direct fluid flowing therefrom into the said lateral flow passage in direction having a component parallel to the piston axis and directed toward said one end.

5. Apparatus according to claim 3 in which said outlet passage is of uniformly increasing diameter in direction of fluid flow therethrough.

References Cited in the file of this patent

UNITED STATES PATENTS

| 540,154 | Dreisoerner | May 28, 1895 |
| 614,441 | Burnett | Nov. 22, 1898 |
| 1,725,539 | Riley | Aug. 20, 1929 |
| 2,441,220 | Dixon | May 11, 1948 |

FOREIGN PATENTS

| 107,765 | Germany | Jan. 8, 1899 |